F. E. GLASSER.
VEHICLE WHEEL.
APPLICATION FILED AUG. 20, 1912.
1,083,009.
Patented Dec. 30, 1913.
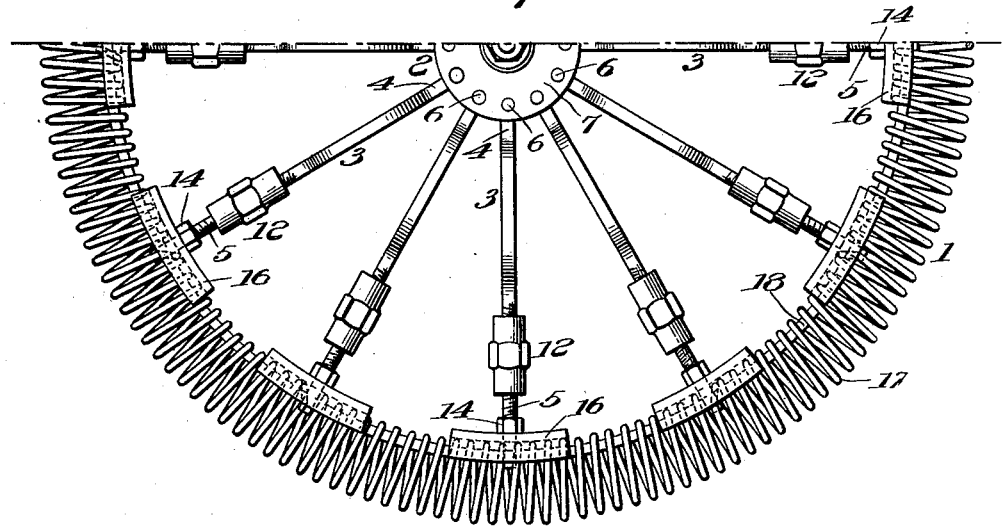
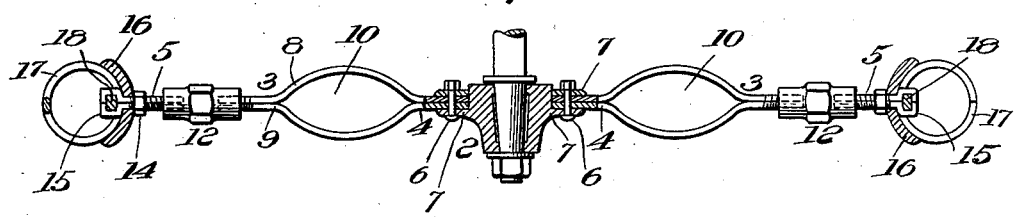

UNITED STATES PATENT OFFICE.

FREDERICK E. GLASSER, OF NEW YORK, N. Y.

VEHICLE-WHEEL.

1,083,009.

Specification of Letters Patent. Patented Dec. 30, 1913.

Application filed August 20, 1912. Serial No. 715,987.

*To all whom it may concern:*

Be it known that I, FREDERICK E. GLASSER, of the city of New York, in the county of New York and State of New York, have invented certain new and useful Improvements in Vehicle-Wheels; and I do hereby declare the following to be a full, clear, and exact description of the invention, such as will enable others skilled in the art to which it appertains to make and use the same.

My invention relates to that class of vehicle wheels in which the tire or tread portion consists of a coiled spring, and my principal objects are to provide improved means for attaching the tread portion to the spokes so as to dispense with rigid or unyielding rims and fellies, and to provide an improved form of spoke having a resilient action coöperating with that of the tread portion.

In the drawing Figure 1 is a side elevation of a vehicle wheel embodying my invention. Fig. 2 is a transverse sectional view.

Referring to the drawing, I have shown the wheel 1 having a hub 2. The spokes 3 are preferably all of similar construction so that a detail description of one will suffice. As shown, each of the spokes comprises inner and outer sections 4, 5, respectively, the inner section being secured to the hub as by a bolt 6 passed through flanges 7 formed on the hub and between which the plates are received. The inner section 4 consists of a pair of plates 8, 9 and at about its center is formed with a bowed portion 10 constituting a spring, preferably by bending the parts 8, 9 outward. Near their outer ends the plates are again united and threaded to receive a threaded sleeve or turnbuckle 12. The outer section 5 of the spoke is threaded oppositely to that of section 4 to receive the turnbuckle and also to receive a binding nut 14. Near its outer extremity section 5 is split longitudinally and the two ends are bent to form an eye or loop 15 extending into the tread portion. A metallic channel member 16 is carried by the spoke and freely movable thereon outside of the nut 14.

The tread portion or tire 17 comprises a continuous coiled spring, the convolutions of which are in radial alinement with the spokes. A ring 18 extends circumferentially throughout the tread portion and within the coils thereof and passes through the eyes 15 of the spokes, the extremities of the spokes extending into the tread portion. The coils adjacent the channel members 16 are therefore held on the inner side by the ring 18 and on the outer side by the channel members 16, which latter are caused to tightly bind against the tire by tightening the nut 14, this nut also holding the parts forming the loop 15 tightly together.

In use the parts are assembled by forming the tread portion with the ring 18 inclosed therein. The tread portion may of course be made up in a plurality of sections and these subsequently united by welding to form the complete circular structure. The section 5 of a spoke is then added, its nut 14 being first released to permit the loop members 15 to pass over the ring 18. Then the nut is tightened, securely holding the ring and binding the coils of the tread portion between the ring and the channel member 16. The turnbuckle 12 then connects the sections 4, 5 and is adjusted to insure the correct length of the spoke. From the foregoing the manner of dismantling the parts will be obvious.

It will be noted that the coils comprising the tread portion are in radial alinement with the spokes and that owing to the several spaced apart channel members 16 the portions of the tire intermediate the channel members allow of greater spring action than the portions in contact with the channel members; but the bowed portion 10 of the spoke compensates for this inequality of resiliency and insures a uniformity of spring action throughout the tire.

I claim as my invention:—

1. In a vehicle wheel, the combination with the tread portion consisting of a metallic coil having a ring therein, of a plurality of metallic spokes secured to the hub of said wheel and extending into said tread portion the extremities of each of said spokes within said tread being bent to form a loop for engaging said ring, and means for binding said spokes in contact with said tread portion.

2. In a vehicle wheel, the combination with the tread portion consisting of a metallic coil having a ring therein, of a plurality of metallic spokes secured to the hub of said wheel and extending into said tread portion, said spokes having each a hooked extremity adapted to engage said ring, a channel member on each of said spokes adapted to bear on said tread portion, and nuts threaded on said spokes and adapted to bear against said channel members.

3. In a vehicle wheel, the combination with the tread portion consisting of a metallic coil having a ring therein, of a plurality of metallic spokes secured to the hub of said wheel and extending into said tread portion, said spokes comprising inner and outer sections, a turnbuckle connecting said sections, said outer section being split longitudinally at its extremity and having its end portions bent to collectively form a loop to receive said ring, a channel member on each of said outer sections adapted to bear on said tread portion, and nuts threaded on said outer sections and adapted to bear against said channel members.

4. A vehicle wheel comprising a hub, metallic spokes connected to said hub, said spokes having each a pair of plates bent to form a bow spring, the outer extremities of said spokes being bent to form a loop, a tread portion consisting of a metallic coil adapted to receive the extremities of said spokes, a retaining ring within said tread designed to pass through the looped extremities of said spokes, and means for securing said ring to said tread and said spokes to said ring.

In testimony whereof, I have signed this specification in the presence of two subscribing witnesses.

FREDERICK E. GLASSER.

Witnesses:
THOMAS F. MCAVOY,
GRAFTON L. MCGILL.

---

Copies of this patent may be obtained for five cents each, by addressing the "Commissioner of Patents, Washington, D. C."